US010611633B2

(12) United States Patent
Redwine

(10) Patent No.: US 10,611,633 B2
(45) Date of Patent: Apr. 7, 2020

(54) SYSTEMS, APPARATUSES, AND METHODS FOR GENERATING ELECTRIC POWER VIA CONVERSION OF WATER TO HYDROGEN AND OXYGEN

(71) Applicant: One Scientific, Inc., Johnson City, TN (US)

(72) Inventor: Michael A. Redwine, Madison, IN (US)

(73) Assignee: One Scientific, Inc., Johnson City, TN (US)

( * ) Notice: Subject to any disclaimer, the term of this patent is extended or adjusted under 35 U.S.C. 154(b) by 181 days.

(21) Appl. No.: 15/692,331

(22) Filed: Aug. 31, 2017

(65) Prior Publication Data
US 2018/0062190 A1 Mar. 1, 2018

Related U.S. Application Data

(60) Provisional application No. 62/381,765, filed on Aug. 31, 2016.

(51) Int. Cl.
| | | |
|---|---|---|
| *C01B 3/04* | (2006.01) | |
| *H01M 8/0656* | (2016.01) | |
| *C25B 1/04* | (2006.01) | |
| *C25B 11/02* | (2006.01) | |
| *C25B 11/04* | (2006.01) | |

(52) U.S. Cl.
CPC .............. *C01B 3/045* (2013.01); *C25B 1/04* (2013.01); *C25B 11/02* (2013.01); *C25B 11/0415* (2013.01); *H01M 8/0656* (2013.01); *Y02E 60/366* (2013.01)

(58) Field of Classification Search
CPC ... C25B 1/02–04; B01J 12/002; H01M 8/004; C01B 3/042; C01B 3/045
USPC ...................................................... 204/155
See application file for complete search history.

(56) References Cited

U.S. PATENT DOCUMENTS

| | | |
|---|---|---|
| 3,901,669 A | 8/1975 | Seitzer |
| 3,932,599 A | 1/1976 | Schulten et al. |
| 4,490,349 A | 12/1984 | Horvath |
| 5,030,661 A | 7/1991 | Lywood |

(Continued)

FOREIGN PATENT DOCUMENTS

| | | | | |
|---|---|---|---|---|
| CA | 1080665 A | * | 7/1980 | ............. C01B 3/045 |
| CA | 1080665 A | | 7/1980 | |

(Continued)

OTHER PUBLICATIONS

International Preliminary Report on Patentability and Written Opinion issued in PCT Application No. PCT/US2017/049610 dated Mar. 5, 2019 (six (6) pages).

(Continued)

*Primary Examiner* — Nicholas A Smith
(74) *Attorney, Agent, or Firm* — Olive Law Group, PLLC

(57) ABSTRACT

Systems, apparatuses, and methods for generating electric power via conversion of water to hydrogen and oxygen. According to an aspect, a method includes applying superheated steam across a catalyst surface within a catalyst chamber to generate ionized steam plasma. The method further includes forming an anode and a cathode between molecules of the ionized steam plasma. The method also includes using the anode and the cathode to generate electricity.

42 Claims, 12 Drawing Sheets

(56) References Cited

U.S. PATENT DOCUMENTS

| | | | |
|---|---|---|---|
| 6,682,714 B2 | 1/2004 | Kindig et al. | |
| 6,875,411 B2 | 4/2005 | Sanfilippo et al. | |
| 7,070,758 B2 | 7/2006 | Peterson | |
| 7,300,643 B2 | 11/2007 | Otsuka et al. | |
| 7,335,320 B2 | 2/2008 | Kindig et al. | |
| 8,354,010 B2 * | 1/2013 | Pless | C01B 3/042 |
| | | | 204/237 |
| 8,608,936 B2 * | 12/2013 | Skomsvold | C01B 3/042 |
| | | | 205/637 |
| 9,797,521 B1 * | 10/2017 | Davis | F16K 1/221 |
| 2004/0095705 A1 | 5/2004 | Mills et al. | |
| 2005/0029120 A1 * | 2/2005 | Bar-Gadda | C01B 3/042 |
| | | | 205/628 |
| 2006/0131008 A1 * | 6/2006 | Ogawa | F28D 7/1669 |
| | | | 165/158 |
| 2007/0178338 A1 * | 8/2007 | McElroy | B01D 53/228 |
| | | | 429/411 |
| 2008/0022593 A1 | 1/2008 | Gur et al. | |
| 2008/0241614 A1 | 2/2008 | McCanney | |
| 2008/0056986 A1 | 3/2008 | Woodall et al. | |
| 2009/0019769 A1 | 1/2009 | Yogev et al. | |
| 2009/0038958 A1 * | 2/2009 | Coyle | B01J 4/002 |
| | | | 205/628 |
| 2009/0084107 A1 | 4/2009 | Gleasman | |
| 2010/0133029 A1 * | 6/2010 | Moran | H01M 8/04089 |
| | | | 180/65.265 |
| 2010/0230272 A1 * | 9/2010 | Gonzalez | C25B 1/04 |
| | | | 204/157.43 |
| 2010/0239943 A1 * | 9/2010 | Kobayashi | H01M 8/04186 |
| | | | 429/479 |
| 2013/0084474 A1 | 4/2013 | Mills | |
| 2014/0072836 A1 | 3/2014 | Mills | |
| 2015/0171455 A1 | 6/2015 | Mills | |
| 2016/0195269 A1 * | 7/2016 | Yoshikawa | F23L 7/005 |
| | | | 110/252 |
| 2017/0152840 A1 * | 6/2017 | Yamazaki | H05H 1/54 |
| 2017/0324303 A1 * | 11/2017 | Stoltenberg | H02K 7/075 |

FOREIGN PATENT DOCUMENTS

| | | |
|---|---|---|
| EP | 0437059 B2 | 3/1997 |
| WO | 9919456 | 4/1999 |
| WO | 2005005009 A3 | 1/2005 |
| WO | 2006123330 A2 | 11/2006 |
| WO | 2008016355 A2 | 2/2008 |

OTHER PUBLICATIONS

International Search Report and Written Opinion issued in counterpart Application No. PCT/US2017/049610 dated Dec. 27, 2017.
Sabat, K.C. et al. (2014) "Reduction of Oxide Minerals by Hydrogen Plasma: An Overview" Plasma Chem Plasma Process Journal (twenty-three (23) pages DOI 10.1007/s11090-013-9484-2.

* cited by examiner

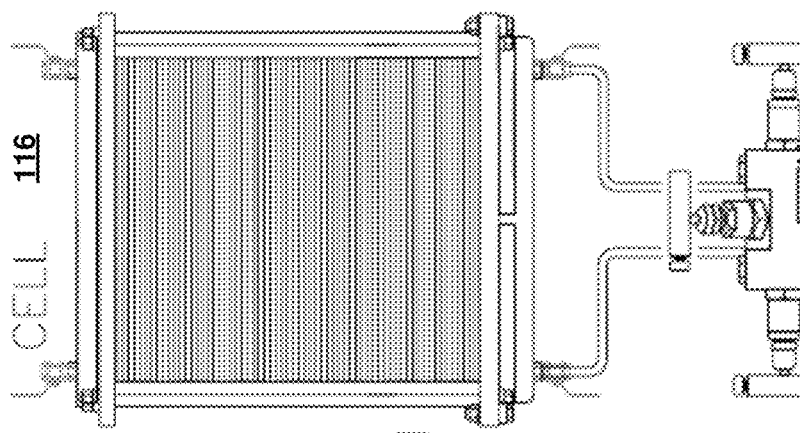

RECHARGEABLE CATALYTIC HYDROGEN FUEL CELL 116

THE RECHARGEABLE CATALYTIC HYDROGEN FUEL CELL IS CONSTRUCTED IN A CELLULAR FASHION USING A DYNAPORE MESH MATERIAL. EACH CELL IS PRELOADED WITH AN ALUMINUM / GALLIUM ALLOY THAT RELEASES HYDROGEN WHEN WATER IS ADDED TO IT RESULTING IN THE OXIDATION OF THE ALLOY. THE CELL IS RECHARGED USING THE HOT HYDROGEN AND OXYGEN FROM THE PREVIOUS MAGNETIC CATALYST CHAMBER

THE HYDROGEN REDUCES THE OXIDIZED METAL BACK TO THE METALLIC STATE RELEASING WATER VAPOR (STEAM)

THIS STEAM CAN ALSO BE CAUGHT USING A CONDENSATE AND BE RECYCLED INTO THROUGH THE SYSTEM

FIG. 1E

SYSTEMS, APPARATUSES, AND METHODS FOR GENERATING ELECTRIC POWER VIA CONVERSION OF WATER TO HYDROGEN AND OXYGEN

CROSS REFERENCE

This application claims the benefit of the U.S. Provisional Application Ser. No. 62/381,765 filed on Aug. 31, 2016 and titled SYSTEMS, APPARATUSES, AND METHODS FOR GENERATING ELECTRIC POWER BY CONVERTING WATER TO HYDROGEN AND OXYGEN, the disclosure of which is incorporated herein by reference in its entirety.

TECHNICAL FIELD

The presently disclosed subject matter relates to power generation. More particularly, the presently disclosed subject matter relates to systems, apparatuses, and methods for generating electric power via conversion of water to hydrogen and oxygen.

BACKGROUND

As the world's population expands, so too does its need for energy. Increased energy consumption is needed to power mobile devices, vehicles and electronics, as well as to power the various industrial, commercial, transportation, and residential sectors. Indeed, the Global Energy Statistical Yearbook provided by Enerdata shows that the U.S. alone consumed 2,204 Mtoe of energy in 2016, while China consumed 3,123 Mtoe of energy. Yet the world's energy sources such as coal, oil and gas, to name a few, are finite. Furthermore, the increased use of these energy sources results in an increased production of noxious gases that contribute to global warming and adversely affect the environment. As such, renewable energy sources are needed.

Hydrogen ($H_2$) is one such renewable energy source because hydrogen is abundantly available. There are several known methods for producing hydrogen. Some examples of these known methods include coal gasification, partial oxidation of oil, reformation of methane steam, and biomass gasification, to name a few. Although these methods can generate hydrogen, a significant disadvantage and limitation of each of these methods is the co-production of carbon dioxide, which is a regulated emission.

A more efficient method of generating hydrogen without also creating carbon dioxide is through the electrolysis of water. This method allows for the production of carbon free hydrogen and oxygen molecules. Electrolysis uses a direct electric current to drive an otherwise non-spontaneous chemical reaction. The voltage needed for electrolysis to occur is called the decomposition potential.

Current methods used to separate water into hydrogen and oxygen come with strong safety concerns. In at least one implementation, a mixture of hydrogen and oxygen remains present inside a catalyst chamber and throughout the system's tubing until the mixture is delivered to the point of combustion. This can result in dangerous ignitions inside the catalyst chamber.

Accordingly, there is a need for improved systems and techniques for separating the gaseous hydrogen and oxygen mixture.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems, apparatuses, and methods for generating electric power via conversion of water to hydrogen and oxygen. According to an aspect, a method includes applying super-heated steam across a catalyst surface within a catalyst chamber to generate ionized steam plasma. The method further includes forming an anode and a cathode between molecules of the ionized steam plasma. The method also includes using the anode and the cathode to generate electricity.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIGS. 1A, 1B, 1C, 1D, and 1E depict an example system for systems, apparatuses, and methods for generating electric power via conversion of water to hydrogen and oxygen in accordance with embodiments of the present disclosure;

DETAILED DESCRIPTION

Figure 1A:
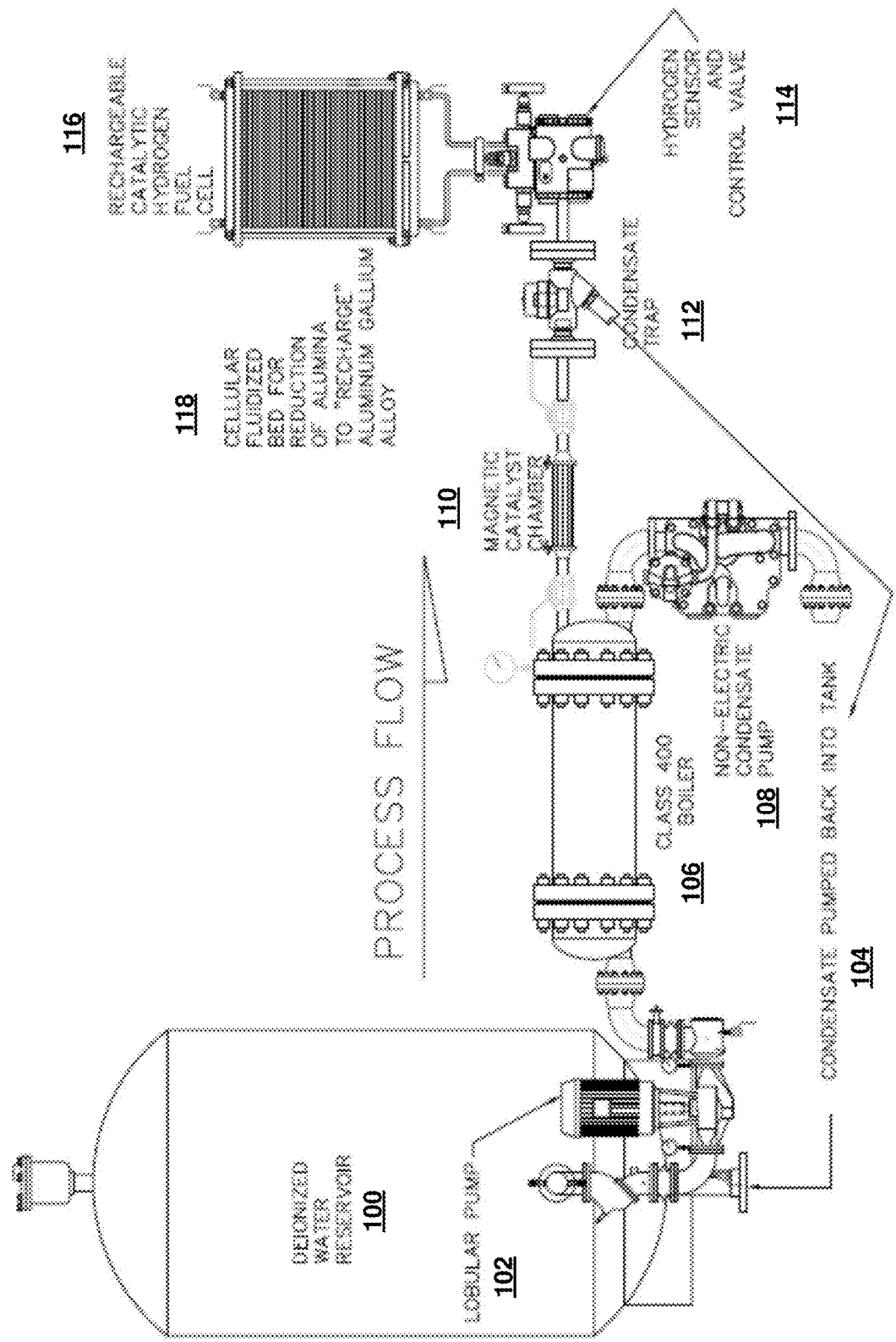

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

As the world's population and corresponding energy needs continue to expand, it becomes readily apparent that current finite energy sources will not be able to keep pace with these demands. Indeed, energy resources from fossil fuels like coal, oil and gas, to name a few, are expected to be depleted within the next few decades. This is quite alarming. As such, there is a strong need for renewable energy sources.

Electrolysis stands as a viable means from which renewable electricity can be generated without adversely affecting the environment. However, current electrolysis methods raise safety concerns since hydrogen gas is a product of electrolysis and it is toxic. In addition, current electrolysis techniques require the use of an external current source, which can be cumbersome and add to the safety concerns. Therefore, it is desirable to create a new apparatus and method to enable safer and more efficient electrolysis of water into hydrogen and oxygen molecules for use in fuel cells to generate direct current electricity, wherein the current source is internally generated and the fuel cell is efficient at generating electricity.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, a server. In another example, a computing device may be any type of conventional computer, such as a laptop computer or a tablet computer or a desktop computer. In another example, the computing device may be a type of network device such as a router or a switch. In another example, the computing device may be a programmable logic controller. In another example, the computing device may be a battery powered Internet of Things (IoT) device. In another example, the computing device may be a microcontroller. In another example, a computing device may be a mobile computing device such as, for example, but not limited to, a smart phone, a cell phone, a pager, a personal digital assistant (PDA), a mobile computer with a smart phone client, or the like. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on servers in a datacenter, the examples may similarly be implemented on any suitable computing device or computing devices.

In accordance with the embodiments, the present disclosure provides systems, apparatuses, and methods for generating electric power via conversion of water to hydrogen and oxygen. For instance, FIG. 1A to 1E illustrate an example system for systems, apparatuses, and methods for generating electric power via conversion of water to hydrogen and oxygen. Referring to FIG. 1A, the system includes a deionized water reservoir 100 that may act as the water source for the steam plasma electrolysis. The system also includes a lobular pump 102 that may act to pump the water from the water reservoir 100 into, in an example, the class 400 boiler 106, which then boils the water to create steam. In another example, a two-zone steam generator and steam super-heater may be employed to produce the super-heated steam. From there, the steam travels into the magnetic catalyst chamber 110. Next, condensates are trapped via the condensate trap 112 that then gets pumped back 104 into the water reservoir 100 using, in an example, a non-electric condensate pump 108. Steam that is not caught by the condensate trap 112 proceed to the rechargeable catalytic hydrogen fuel cell (RCHFC) 116 in a controlled manner, as monitored and controlled by the hydrogen sensor and control valve 114. The rechargeable catalytic hydrogen fuel cell 116 contains a cellular fluidized bed 118 for reduction of, in an example, alumina in order to recharge the aluminum gallium alloy catalyst in this example.

Figure 1B:
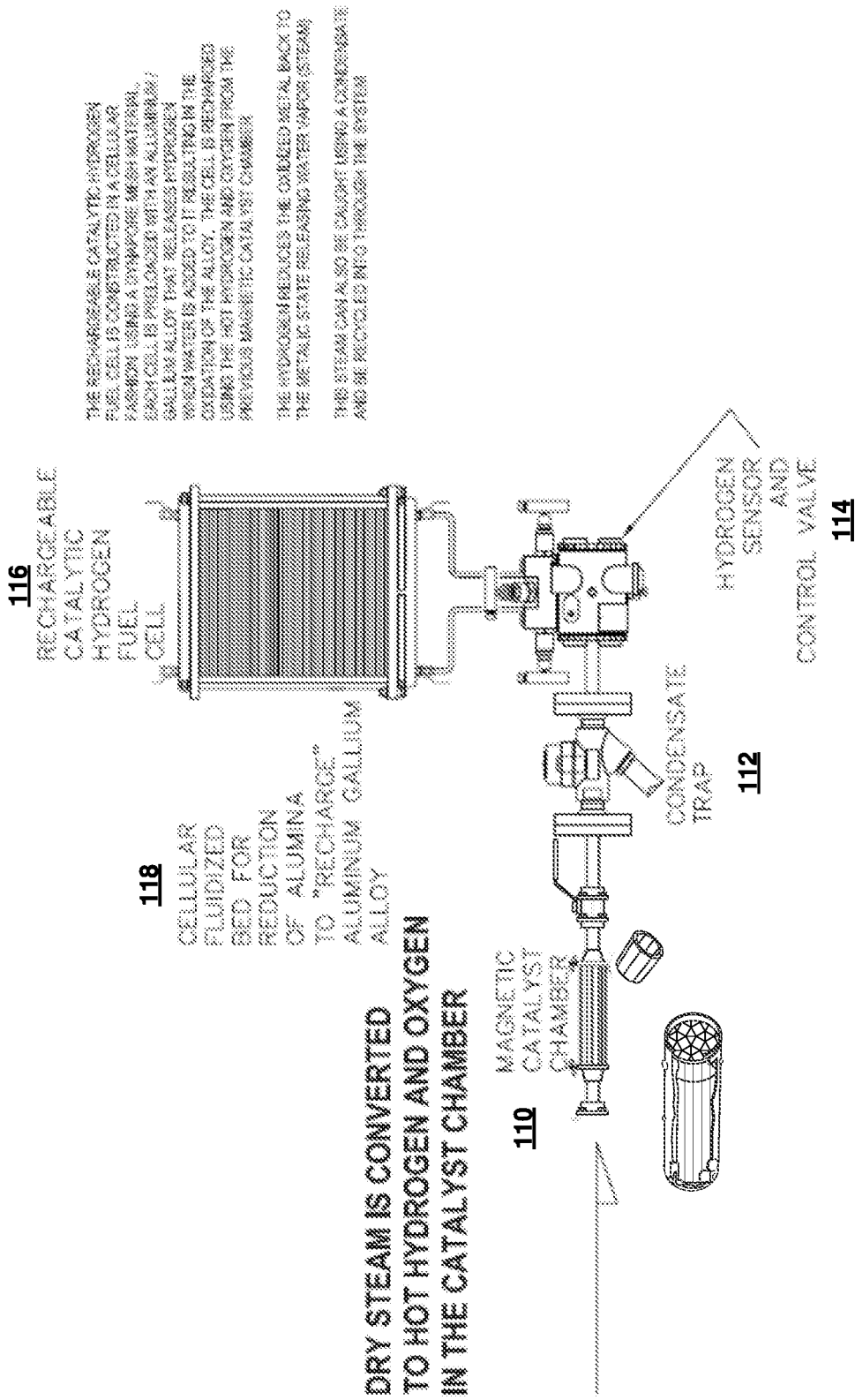

FIG. 1B shows the magnetic catalyst chamber 110, the condensate trap 112, the hydrogen sensor and control valve 114, the rechargeable catalytic hydrogen fuel cell 116, and the cellular fluidized bed 118 in more detail. The magnetic catalyst chamber 110 receives the dry steam from the class 400 boiler 106 prior to converting that dry steam into hydrogen gas and oxygen gas within the magnetic catalyst chamber 110. In an example, the rechargeable catalytic hydrogen fuel cell 116 is constructed in a cellular fashion using a mesh material. In an example, the mesh material can be a Dynapore® mesh material. Each rechargeable catalytic hydrogen fuel cell 116 can be preloaded with, in an example, an aluminum/gallium alloy that releases hydrogen when water is added due to a resulting oxidation of the alloy. The rechargeable catalytic hydrogen fuel cell 116 is recharged using the hydrogen and oxygen gases from the magnetic catalyst chamber 110. That is, the hydrogen from the magnetic catalyst chamber 110 can be used by the rechargeable catalytic hydrogen fuel cell 116 to recharge the oxidized aluminum/gallium alloy back to a metallic state, thus enabling the release of water vapor, i.e. steam. This steam can also then be caught by the condensate trap 112 for recycling back into the system.

Figure 1C:
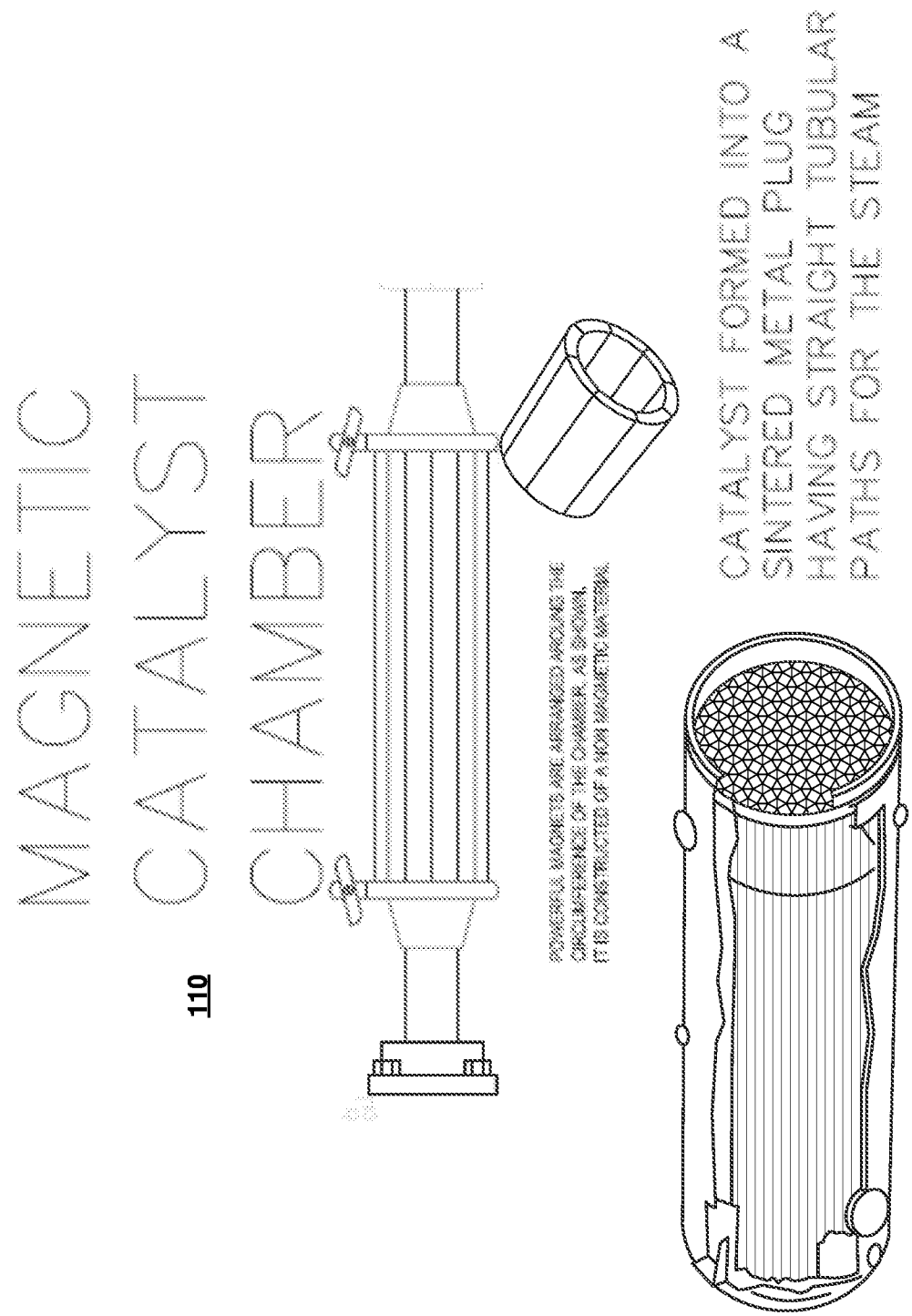

FIG. 1C shows the magnetic catalyst chamber 110 in more detail. In an example, the catalyst surface within the magnetic catalyst chamber 110 is formed into a sintered metal plug shape that contains straight tubular paths for the steam to proceed through the chamber 110. The magnetic catalyst chamber 110 may be constructed using, in an example, an aluminum tube and brass adapter end caps that adapts from ¼" NPT (national pipe thread) to 2" NPT diameter on one end of the aluminum tube and 2" NPT to ⅛" NPT on the other end of the aluminum tube. Inside both of the brass adapter fittings may be a fluidizing media, such as a Dynapore® fluidizing media, wherein the media is a screen-like material that provides an even flow through the catalyst surface residing inside the magnetic catalyst chamber 110. In an example, the catalyst surface can be granular.

Figure 1D:
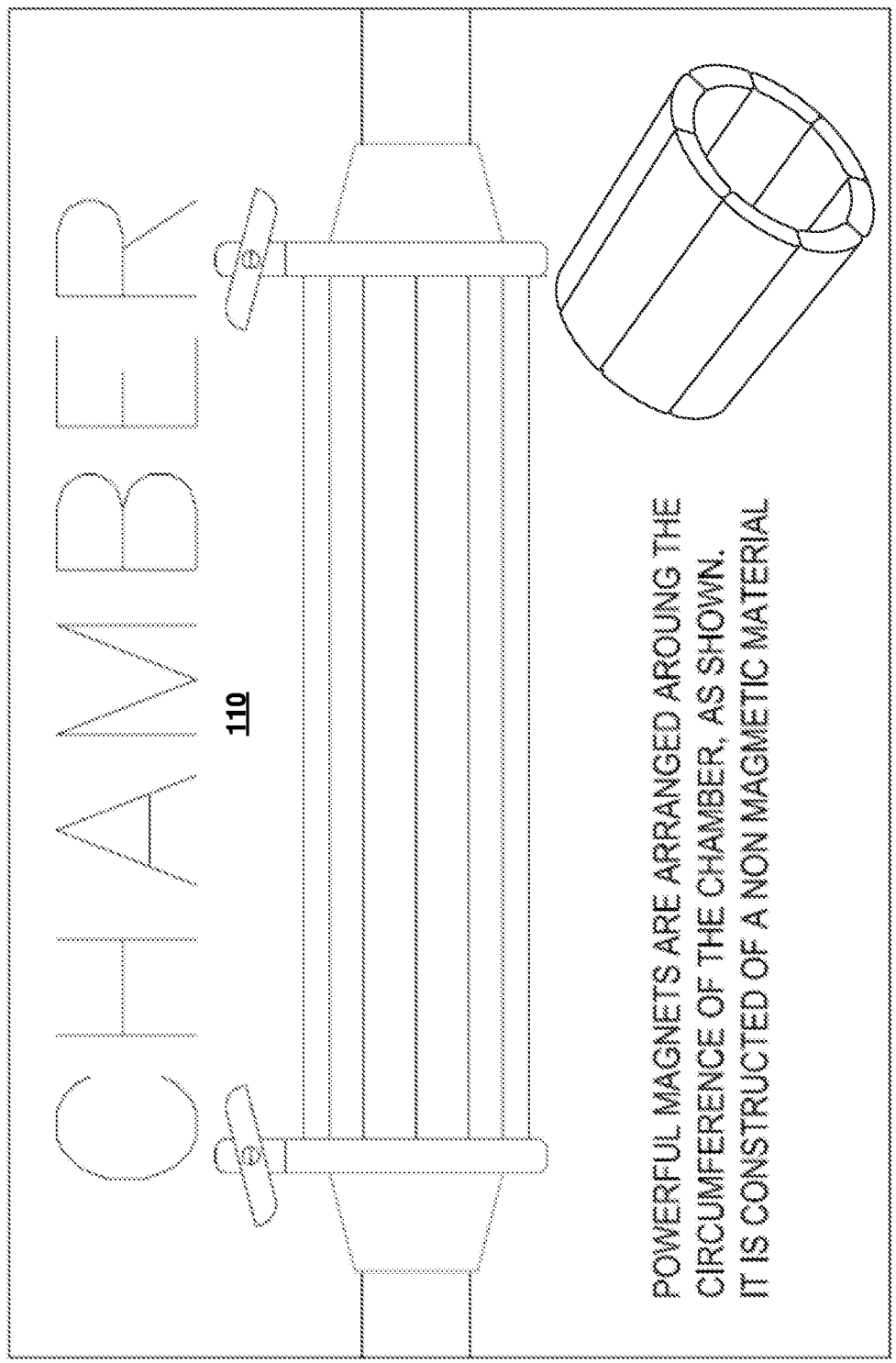

FIG. 1D shows the magnets within the magnetic catalyst chamber 110 in more detail. In an example, the magnets are rare earth permanent magnets such as high energy, anisotropic N42SH Neodymium magnets. These powerful magnets can be arranged around the circumference of the magnetic catalyst chamber 110 wherein the chamber can be, for instance, constructed of a non-magnetic material. An example of the non-magnetic material was previously described in FIG. 1C.

FIG. 1E shows an enlarged image of the rechargeable catalytic hydrogen fuel cell 116 that can be used in the system shown in FIG. 1A.

Examples that can embody the presently disclosed subject matter are now described in more detail.

Figure 2:
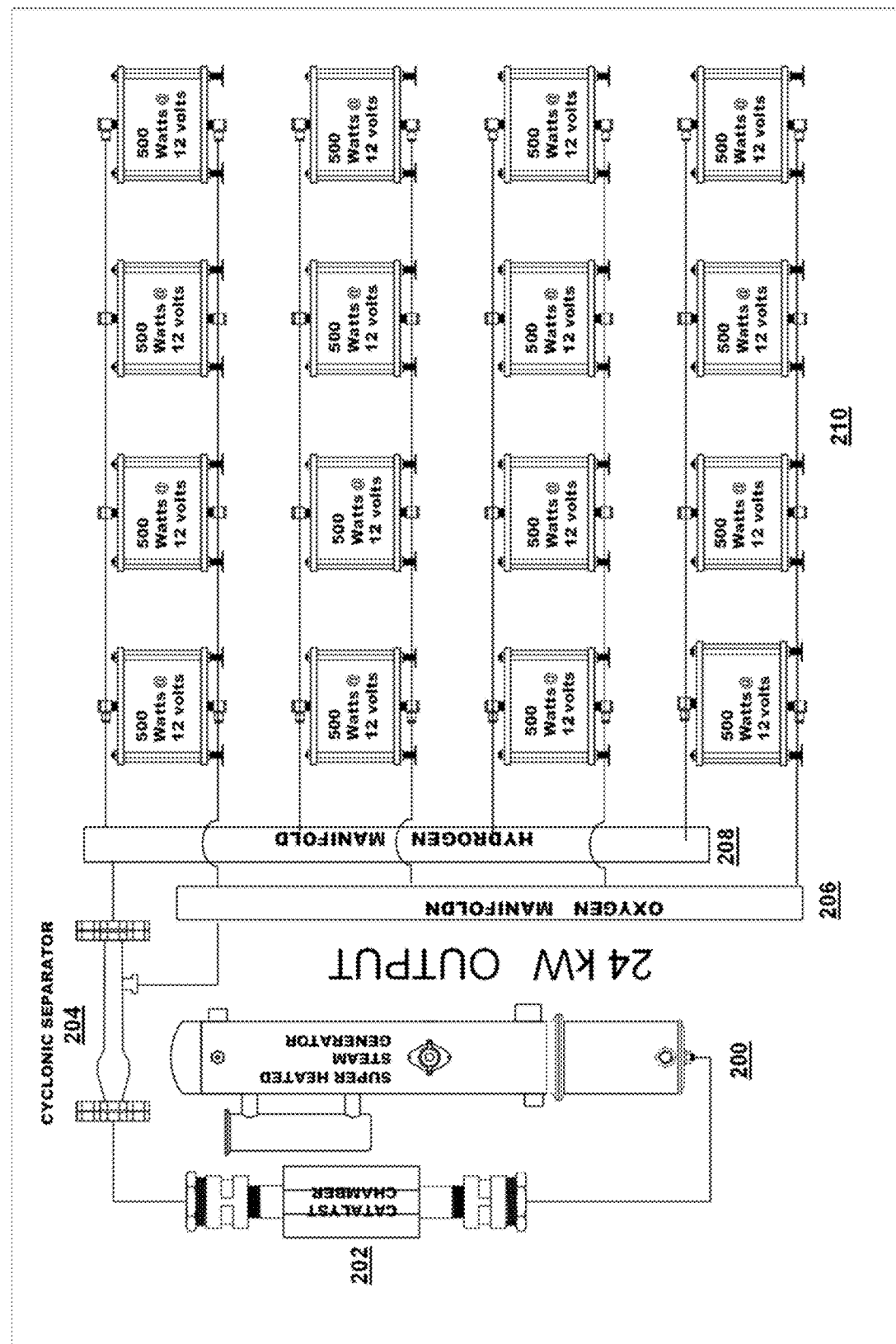
FIG. 2 depicts another example system in accordance with embodiments of the present disclosure.

FIG. 2 depicts another example system in accordance with embodiments of the present disclosure. The steam plasma electrolysis process begins with a generation of steam in the super-heated steam generator 200. In an example, the steam can be created by conventional methods such as heating a pressure vessel using electricity, using a heat exchanger, and/or using combustion technologies in order to raise the steam to a temperature of about 350° C. to about 450° C. Likewise, energy sources for this system can be harvested from wind, solar, waste reclamation, and "off peak" grid electrical sources. Returning now to the generated steam, the steam then travels from the steam generator 200 to the catalyst chamber 202, i.e. the magnetic catalyst chamber 202, via, in an example, a stainless-steel tube. The catalyst chamber 202 can be comprised of a large aluminum tube with two opposing ends, wherein each end comprises a stainless-steel wire mesh pressed together to cause an even flow of the super-heated steam. In an example, the stainless-steel wire mesh is a type of fluidizing media, such as a Dynapore® fluidizing media.

Still referring to FIG. 2, the catalyst chamber 202 comprises a catalyst surface upon which a reaction with the generated steam takes place. The catalyst surface comprises one of multi-walled carbon nanotubes, aluminum-gallium alloys, chromium and chromium-rare earth alloys, cobalt, cobalt samarium alloys, manganese, molybdenum, nickel, niobium, zirconium, palladium, and germanium. The generated steam gets applied across the catalyst surface within the catalyst chamber 202 to generate ionized steam plasma, which is also known as steam plasma. The catalyst chamber 202 contains one or more of the catalyst surface, wherein the catalyst surface is arranged so that it would allow for an even flow of the steam through the catalyst chamber 202. To do so, the catalyst surface must be configured so that its shape and particle size allows for optimum even steady flow within the catalyst chamber 202. Some examples of possible shapes and configurations include at least one of a sintered plug, a nanotube, a microtube, and a granular shape.

Figure 4:
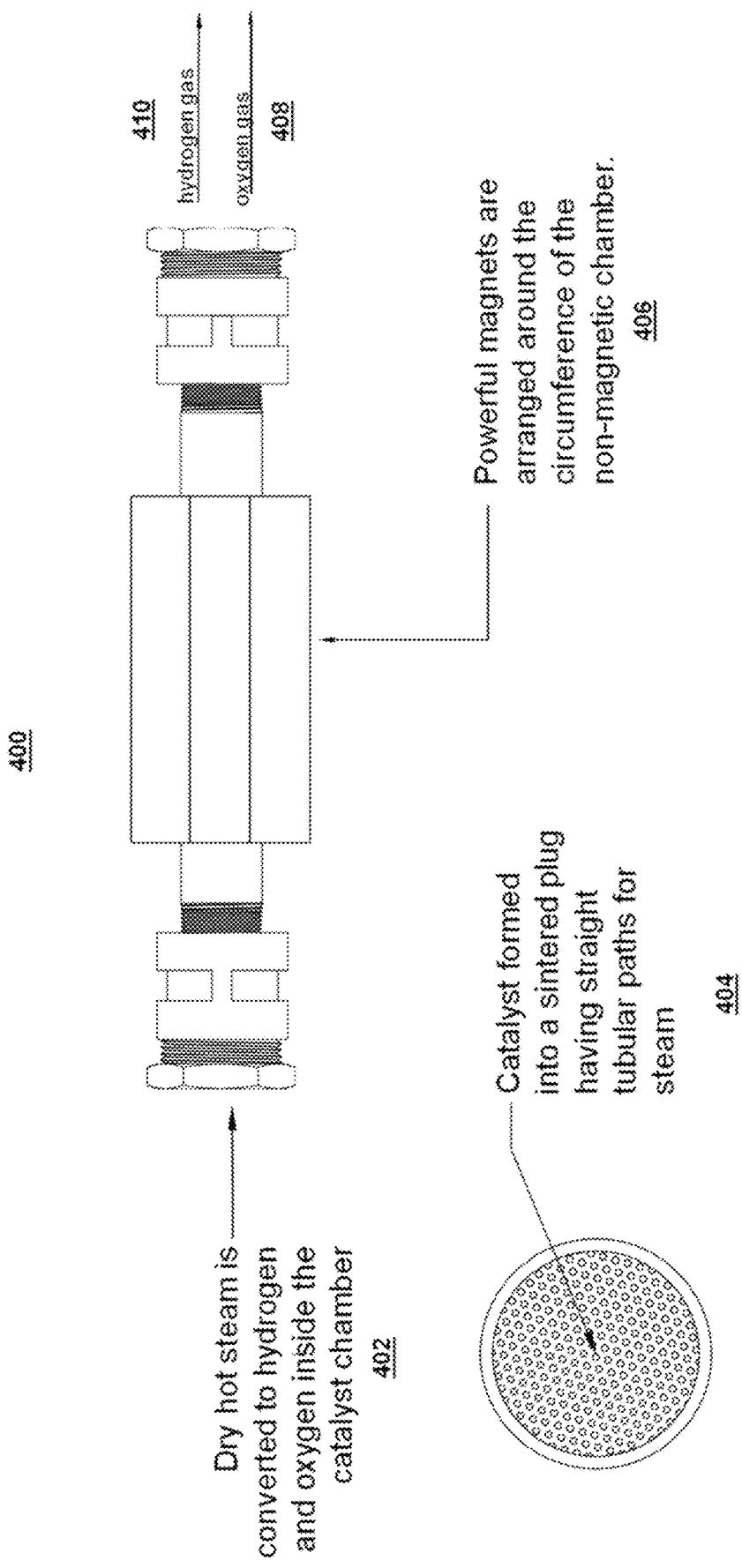
FIG. 4 shows the magnetic catalyst chamber that can be used in the system depicted in FIG. 2 in accordance with embodiments of the present disclosure.

Still referring to FIG. 2, the catalyst chamber 202 can be surrounded by an array of, in an example, high energy anisotropic magnets. The magnets can be, for example, high energy anisotropic N42SH Neodymium magnets having an energy density of at least 1.3 Tesla. The magnets are positioned in a configuration to achieve a predetermined density of magnetic flux within the catalyst chamber 202 in order to create a magnetic field within the catalyst chamber 202. Specifically, the magnets are arranged so that they cover at least 80% of a length of the catalyst chamber 202 and are substantially, linearly centered within the catalyst chamber 202. This is done to ensure that a maximum density of magnetic flux is achieved within the catalyst chamber 202. FIG. 4, as is subsequently described, shows the catalyst chamber 202 and its processes in more detail.

Still referring to FIG. 2, as the ionized steam plasma moves through the magnetic field within the catalyst chamber 202, it acts as an electrical conductor, thereby creating an electrical current. Thus, an electromotive force is created by the movement of the ionized steam plasma through the magnetic field within the catalyst chamber 202. Unlike other electrolysis processes which rely upon an external current source, the electrical current in the present disclosure is generated internally within the catalyst chamber 202 via the movement of the ionized steam plasma through the magnetic field. Furthermore, the creation of the electromotive force causes electrolysis of the ionized steam plasma, leading to a formation of an anode and a cathode between the two ionized steam plasma molecules. This unique manner of electrolysis, i.e. steam plasma electrolysis, subsequently causes a molecular dissociation of hydrogen molecules from oxygen molecules, as depicted by the following chemical reaction:

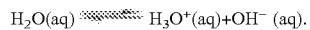

$$H_2O(aq) \rightleftharpoons H_3O^+(aq) + OH^-(aq).$$

After the steam plasma electrolysis, the resulting mixture of hydrogen gas, oxygen gas, and a small amount of water vapor then exits the catalyst chamber 202.

Figure 5:
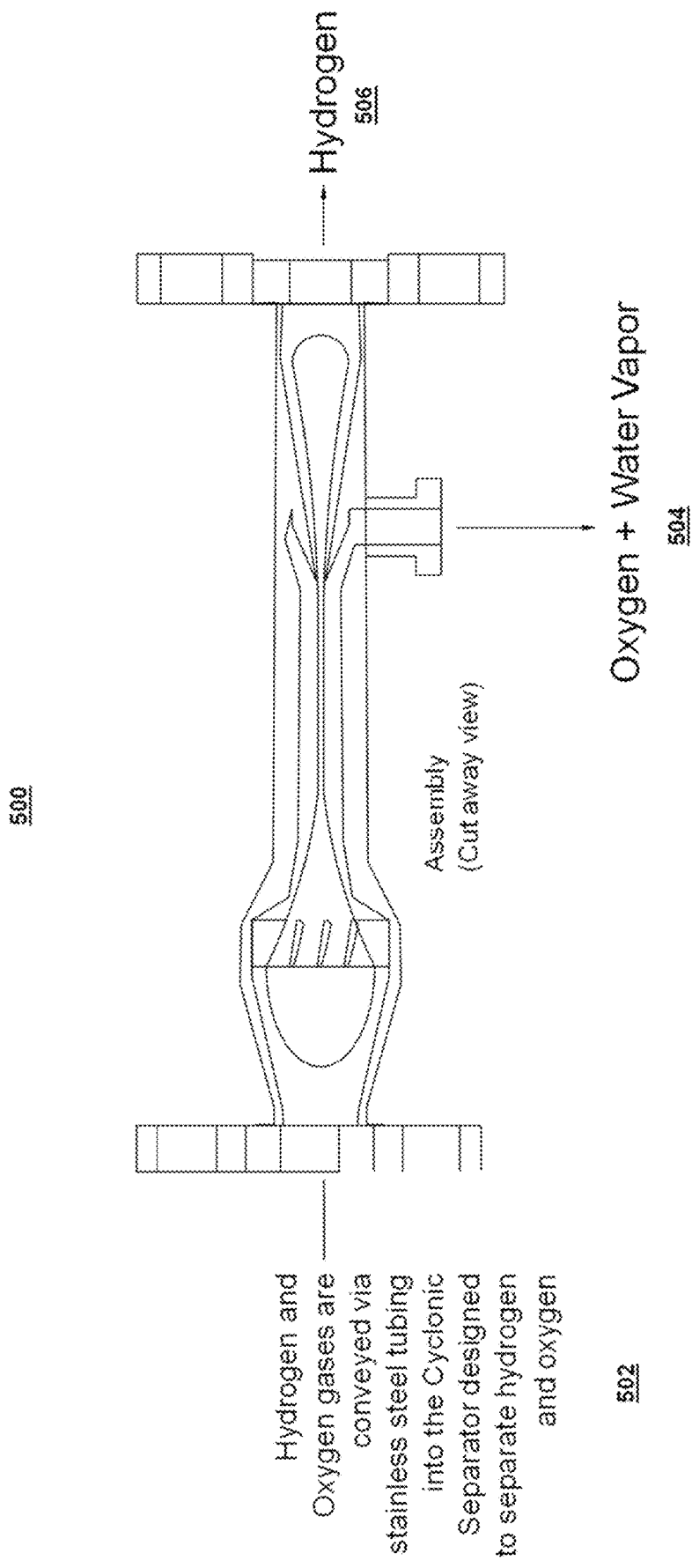
FIG. 5 shows the cyclonic separator that can be used in the system depicted in FIG. 2 in accordance with embodiments of the present disclosure.

Still referring to FIG. 2, this mixture of hydrogen gas, oxygen gas, and the small amount of water vapor then proceeds to the cyclonic separator 204 for separation. The cyclonic separator 204 is comprised of an inner and outer body. The outer body has a venturi configuration, while the inner body has a configuration that comprises fins and egg-shaped projections. This configuration enables heavier gases, like oxygen and water vapor, to spin towards the outside of the cyclonic separator 204 and to exit in a perpendicular manner to the cyclonic separator 204. That is, the oxygen gas and the water vapor exit via an outlet positioned in a substantially perpendicular manner to the cyclonic separator 204. Meanwhile, the lighter hydrogen gas goes straight through the cyclonic separator 204. FIG. 5, as is subsequently described, shows the cyclonic separator 204 and its processes in more detail.

Still referring to FIG. 2, the separated gases now move to their respective manifolds: the heavier gases oxygen and water vapor go to the oxygen manifold 206, while the lighter hydrogen gas goes to the hydrogen manifold 208. In an example experiment, an analysis of the hydrogen gas shows a 99% purity level.

Figure 6:
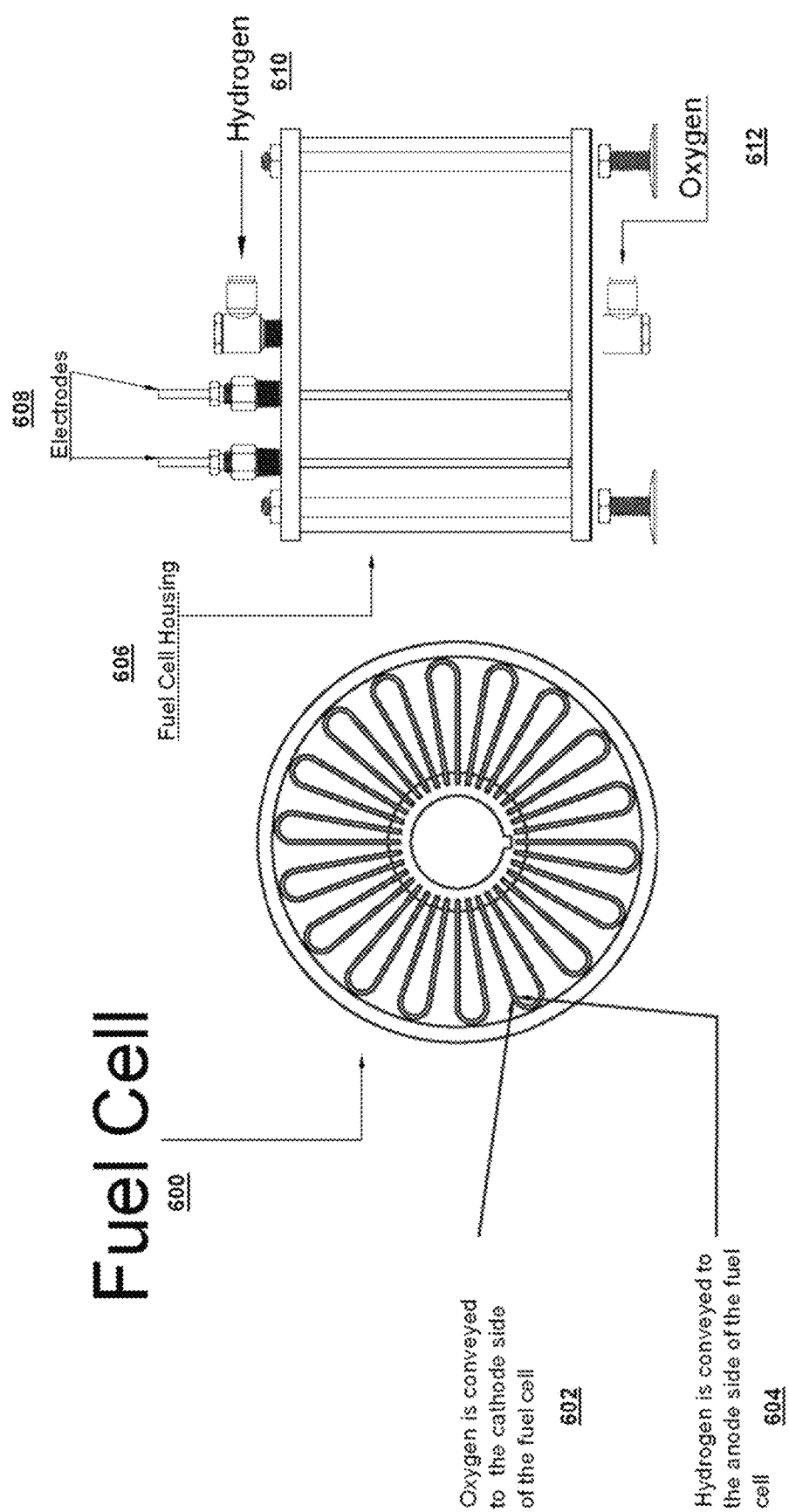
FIG. 6 shows the fuel cell that can be used in the system depicted in FIG. 2 in accordance with embodiments of the present disclosure.

Still referring to FIG. 2, a user can engage an automated selector valve that is part of this system in order to either compress and store the gases or to use them in the at least one fuel cells 210 to generate electricity. If a selection for compression is made, then a conventional compressor can be used to, for instance, refuel a hydrogen vehicle or for some other hydrogen demands. In contrast, if a selection is made to generate electricity, then the gases will be sent to the at least one fuel cells 210 to generate the direct current electricity. Each fuel cell 210 has anode terminal and cathode terminal connections attached thereto. The fuel cell 210 receives the hydrogen gas in the anode terminal, while it receives the oxygen gas in the cathode terminal. FIG. 6, as is subsequently described, shows the fuel cell 210 and its processes in more detail. The electricity generated by each fuel cell 210 is, in an example, at least 500 W at 12V.

Still referring to FIG. 2, in an example, the system shown in FIG. 2 comprises an array of 48 to 64 fuel cells 210 that are arranged and plumbed so that the oxygen and hydrogen gases may be evenly distributed to these fuel cells 210.

Continuing this example, the fuel cells 210 can be in sets of 12 fuel cells 210 arranged in a series configuration, and then also arranged in a parallel configuration. This unit of fuel cells 210 can then be wired to an inverter to provide alternating current power. A direct current power outlet may also be provided. Multiple units of fuel cells 210, configured as described above, can be joined together to provide larger amounts of current, if so desired.

Figure 3:
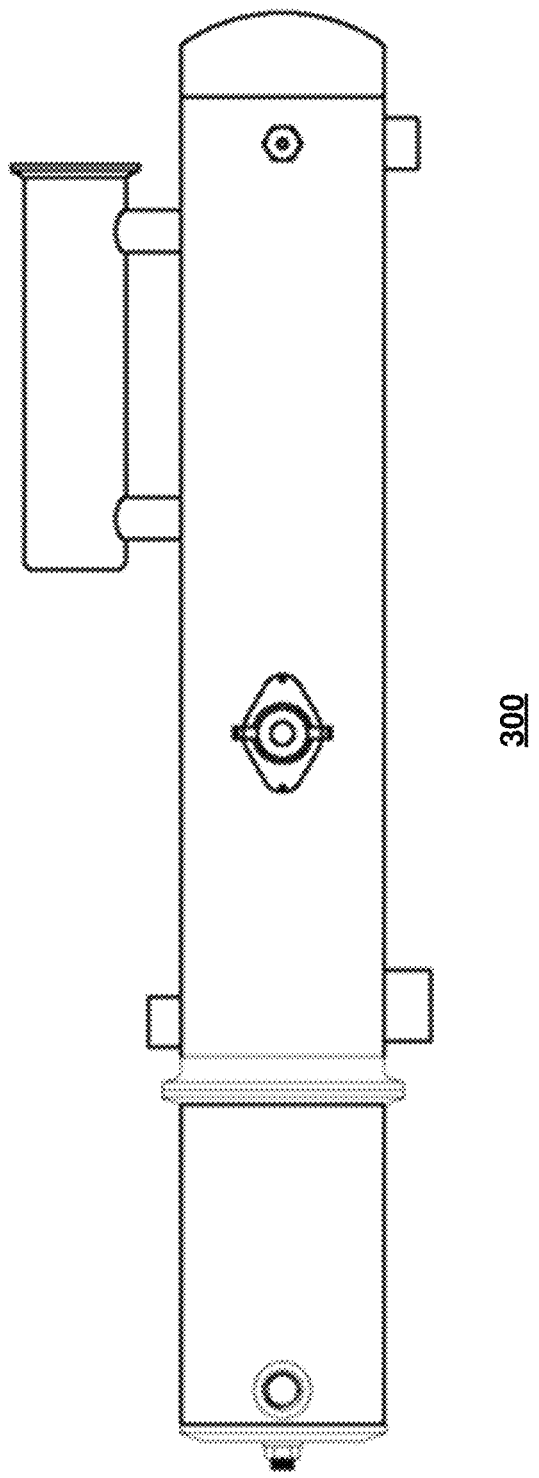
FIG. 3 shows the super-heated steam generator that can be used in the system depicted in FIG. 2 in accordance with embodiments of the present disclosure.

FIG. 3 shows an enlarged image of the super-heated steam generator 200, 300 that can be used in the system shown in FIG. 2 in accordance with embodiments of the present disclosure.

FIG. 4 shows an enlarged image of the magnetic catalyst chamber 202, 400 that can be used in the system depicted in FIG. 2 in accordance with embodiments of the present disclosure. The catalyst chamber 202, 400 receives the dry hot steam 402, i.e. the generated steam, that originates from the super-heated steam generator 200, 300. As was previously described above, the dry hot steam 402 is eventually dissociated via the unique method of steam plasma electrolysis that stems from the creation of an electromotive force and an internal current generation.

Still referring to FIG. 4, an example configuration for the catalyst surface is shown. Specifically, the catalyst surface has been formed into a sintered plug configuration 404, which enables straight tubular paths for the dry hot steam 402 to proceed through the catalyst chamber 202, 400. In addition, powerful magnets are arranged around the circumference of the catalyst chamber 202, 400, which itself comprises a non-magnetic material 406. In an example, the magnets are high energy anisotropic N42SH Neodymium magnets with an energy density of at least 1.3 Tesla.

Still referring to FIG. 4, upon steam plasma electrolysis, the dissociated hydrogen gas 410, oxygen gas 408, and a small amount of water vapor then exit the magnetic catalyst chamber 202, 400. This mixture then goes to the cyclonic separator 204, which is described in FIG. 5 below.

FIG. 5 shows an enlarged image of the cyclonic separator 204, 500 that can be used in the system depicted in FIG. 2 in accordance with embodiments of the present disclosure. A cut away view of the cyclonic separator 204, 500 is given in order to show its distinctive shape. The cyclonic separator 204, 500 has two bulbous shapes at its opposing ends, wherein the bulbous shapes have tapered ends where they connect to each other via a singular tube. As was previously mentioned, the cyclonic separator 204, 500 has an outer body with a venturi configuration, while the inner body has a configuration that comprises fins and egg-shaped projections. Indeed, this configuration can be seen here in the cut away view.

Still referring to FIG. 5, the dissociated hydrogen gas 410, oxygen gas 408, and a small amount of water vapor that exited the catalyst chamber 202, 400 now enter the cyclonic separator 204, 500 for separation. The dissociated hydrogen gas 410 and oxygen gas 408 are conveyed 502 via, in an example, stainless-steel tubing into the cyclonic separator 204, 500 whose distinctive shape is designed to separate the dissociated hydrogen gas 410 and oxygen gas 408. As was previously mentioned, this shape allows heavier gases, like oxygen gas 408 and water vapor, to spin towards the outside of the cyclonic separator 204, 500 and to exit in a perpendicular manner 504 from the cyclonic separator 204, 500. Meanwhile, the lighter hydrogen gas 410 goes straight through 506 the cyclonic separator 204, 500.

FIG. 6 shows an enlarged image of the at least one fuel cell 210, 600 that can be used in the system depicted in FIG. 2 in accordance with embodiments of the present disclosure. The plurality of fuel cells 210, 600 can be wired in series or in parallel depending on whether an increase in voltage or an increase in current is desired. If an increase in voltage is desired, then the fuel cells 210, 600 are wired in series, while an increase in current is achieved by a parallel wiring of the fuel cells 210, 600. As previously mentioned, the oxygen from the oxygen manifold 206 is conveyed 602 to the cathode side of the fuel cell 210, 600, while the hydrogen from the hydrogen manifold 208 is conveyed 604 to the anode side of the fuel cell 210, 600.

Still referring to FIG. 6, the fuel cell 210, 600 shows components that are radially dispersed from a central circular core. The radial components are the plurality of substrate loops that are attached to a central circular core comprising a central hydrogen fuel tube. The central hydrogen fuel tube comprises a cylindrical tube that extends the height of the fuel cell 210, 600 with perforations throughout the height to route gases to the plurality of substrate loops that radiates out from the central hydrogen fuel tube. The substrate loops comprise an interior that serves as an anode and an exterior that serves as a cathode. That is, the inner substrate loop serves as an anode for receiving hydrogen gas 604, while the outer substrate loop serves as a cathode for receiving oxygen gas 602. The substrate loops comprise, in an example, a semi-permeable polytetrafluoroethylene (PTFE) with a thickness range of about 0.2 mm to about 0.5 mm thick, wherein the anode and cathode sides are each sputtered to a thickness of about 20 to 200 Angstroms on opposing sides of the substrate loop. In an example, each fuel cell 210, 600 has 18 such substrate loops which are attached radially to the central hydrogen fuel tube. The central hydrogen fuel tube and the plurality of substrate loops are placed in a sealed cylindrical housing. This enables the oxygen gas 602 to be routed to the outside of the substrate loop, i.e. to the cathode side of the substrate loop.

Still referring to FIG. 6, the anode is created, in an example, by applying a gradient mix of anode materials and sputtering or air brushing the anode materials onto one side of the substrate. In this example, the following anode materials can be applied in the order listed, although other suitable materials and order can be used: (1) indium tin oxide; (2) lanthanum nickel aluminum alloy; (3) nickel cobalt oxide nano-powder suspended in a thin adhesive carrier; and (4) palladium doped with yttrium suspended in a thin adhesive carrier. Here, the nickel cobalt oxide is applied by air brushing. Essentially, ultra-thin layers of the anode materials can be sputtered or air brushed onto the substrate until the anode materials reach a thickness of between 20 Angstroms to 200 Angstroms. Likewise, the cathode materials can be sputtered or air brushed onto the opposing side of the substrate to a thickness of between 20 Angstroms to 200 Angstroms. In this example, the following cathode materials can be applied in the order listed, although other suitable materials and order can be used: (1) graphene or carbon nanotube; (2) cerium oxide suspended in a thin adhesive carrier; and (3) strontium ferrite powder suspended in a thin adhesive carrier. Here, the cerium oxide and strontium ferrite are applied by air brushing. Thus, the anode and cathode are created by applying ultra-thin layers of a gradient mix of materials, as previously described, to opposing sides of the substrate via sputtering or thin film air brushing techniques.

Still referring to FIG. 6, the fuel cell 210, 600 contains electrodes 608 on top of the fuel cell 210, 600. The electrodes 608 serve as an outlet for outputting the generated direct current electricity. That is, these electrodes are for the direct current electricity generated from the fuel cell 210, 600. The electrodes 608 are comprised of, in an example, brass metal rods that extend from making contact with the substrates to the outside of the fuel cell 210, 600. One electrode is the anode electrode because it makes contact with the anode side of the substrates inside the fuel cell 210, 600. Likewise, the other electrode is the cathode electrode because it makes contact with the cathode side of the substrate.

Still referring to FIG. 6, the fuel cell 210, 600 is also encased within a fuel cell housing 606 that houses the central hydrogen fuel tube and the substrate loops. In an example, the fuel cell housing 606 comprises non-electrically conductive materials, such as clear acrylic tube and plates. In another example, the non-electrically conductive material may be a ceramic type material or a fluoro-plastic material. A terminal 610 for receiving the hydrogen gas from the hydrogen manifold 208 is located on top of the fuel cell 210, 600, while a terminal 612 for receiving the oxygen gas from the oxygen manifold 206 is located on the bottom of the fuel cell 210, 600. In an example, the terminal 610 for receiving the hydrogen gas is denoted the anode terminal. Likewise, the terminal 612 for receiving the oxygen gas is denoted the cathode terminal. Each fuel cell 210, 600 can produce, in an example, about 500 W of direct current electricity at 12V. The direct current electricity is generated within the fuel cell 210, 600 by a reaction of the hydrogen gas with the oxygen gas to produce water vapor, heat, and the direct current electricity. Water vapor and condensed water resulting from this reaction is removed via a bottom side port of the fuel cell 210, 600.

Figure 7:
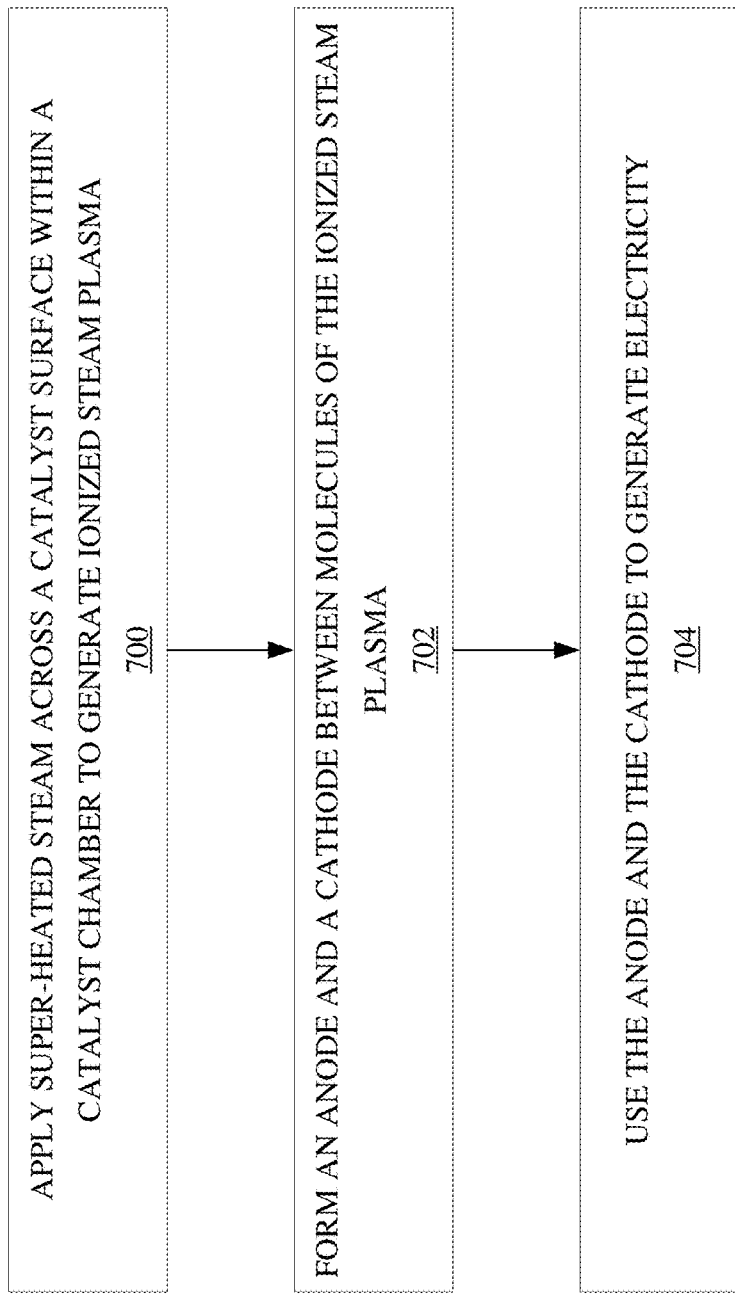
FIG. 7 is a flowchart of an example method for systems, apparatuses, and methods for generating electric power via conversion of water to hydrogen and oxygen in accordance with embodiments of the present disclosure.

FIG. 7 illustrates a flowchart of an example method for systems, apparatuses, and methods for generating electric power via conversion of water to hydrogen and oxygen in accordance with embodiments of the present disclosure. The method of FIG. 7 is described by example as being implemented by the systems shown in FIG. 1 and FIG. 2, although it should be understood that the method may be implemented by any suitable system(s).

Still referring to FIG. 7, the method includes applying 700 super-heated steam across a catalyst surface within a catalyst chamber 202, 400 to generate ionized steam plasma. The method also includes forming 702 an anode and a cathode between molecules of the ionized steam plasma. The method further includes using 704 the anode and cathode to generate electricity. In an example, the electricity is direct current electricity and the generation is performed using fuel cells 210, 600. The method steps of FIG. 7 have previously been described in further detail in relation to the other figures.

Figure 8:
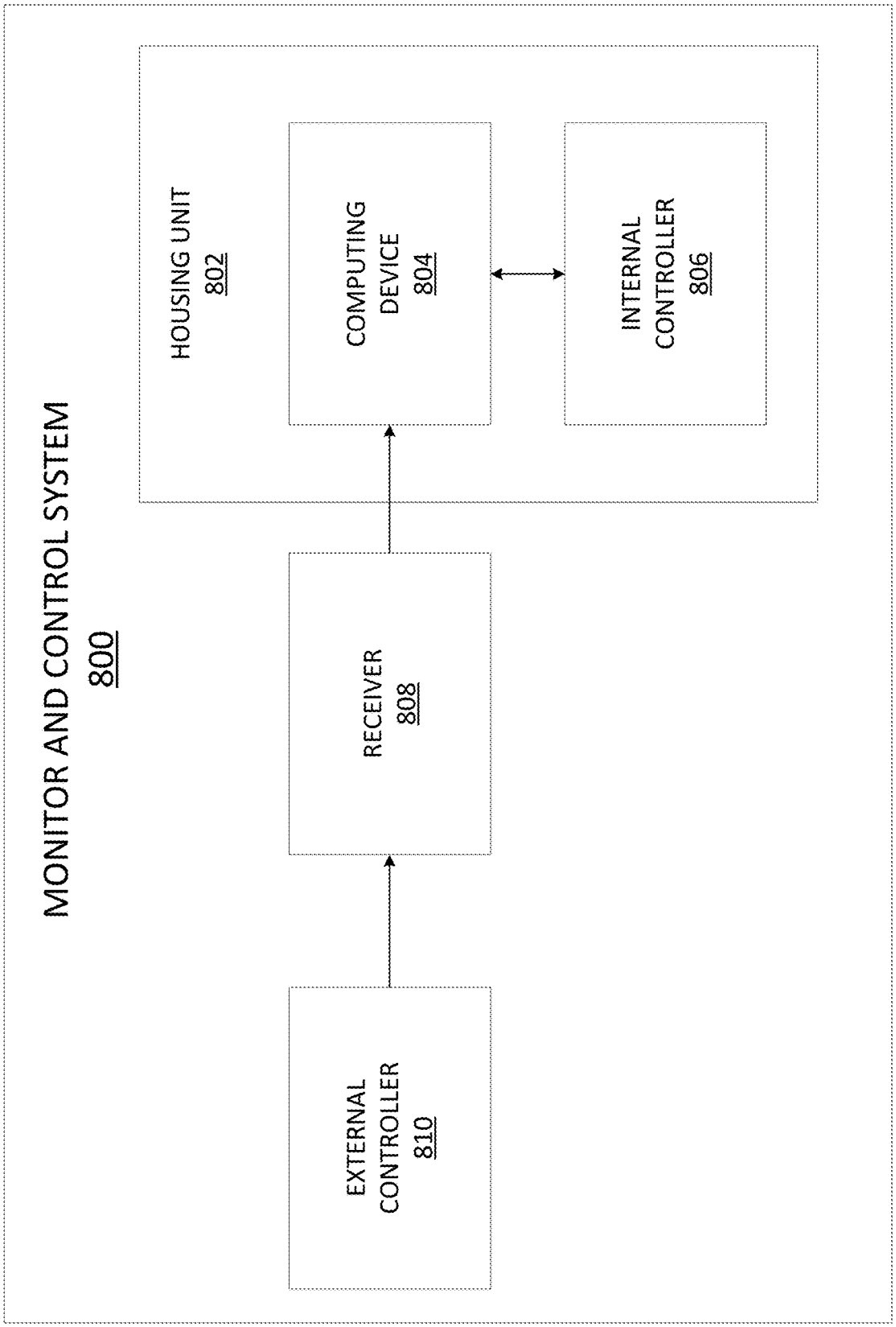
FIG. 8 is a block diagram of an example monitor and control system for systems, apparatuses, and methods for generating electric power via conversion of water to hydrogen and oxygen in accordance with embodiments of the present disclosure.

FIG. 8 illustrates a block diagram of an example monitor and control system 800 for systems, apparatuses, and methods for generating electric power via conversion of water to hydrogen and oxygen in accordance with embodiments of the present disclosure. The monitor and control system 800 comprises a housing unit 802 that houses the computing device 804 and the internal controller 806. The monitor and control system 800 also comprises an external controller 810 and a receiver 808 for the external controller 810. The computing device 804 comprises the internal controller 806 which comprises, in an example, a data logger and a plurality of sensors to monitor data characteristics. The data characteristics comprises at least one of a temperature, a pressure, an electrical power usage, a gas flow, a gas analysis, an electrical power generation, an output voltage from at least one of a fuel cell, and an input current characteristic. That is, the plurality of sensors can monitor these data statistics and provide it to the data logger for cataloging. This information then becomes available to the internal controller 806 in order to monitor the conditions for generating electricity, including the output conditions. That is, the internal controller 806 can be used to monitor the health of the system for, in an example, preventative health maintenance purposes. In another example, the internal controller 806 may comprise a programmable logic controller, as is subsequently described.

Still referring to FIG. 8, the computing device 804 comprises an external controller 810 to manage operating parameters and report data characteristics upon a user request. The computing device 804 may also change the operating parameters when directed to do so by the external controller 810, as is subsequently described. In an example, the operating parameters comprise at least one of a gas flow, a temperature in a steam generation system, and a shutdown of operation. The user request can be done via a user interface, wherein the user interface and the computing device 804 can be implemented by hardware, software, firmware, or combinations thereof. The computing device 804 may include a user interface, such as a display (for e.g., touchscreen display), a touchpad, and/or the like. The computing device 804 may be any suitable computer such as a laptop computer, a tablet computer, or a desktop computer. In another example, the computing device 804 may be a mobile computing device. In yet another example, the computing device 804 may be a battery powered Internet of Things (IoT) device. In another example, the computing device 804 may be a programmable logic controller, wherein the programmable logic controller acts as an internal controller of the computing device 804. In the latter example, the programmable logic controller can comprise a supervisory control and data acquisition program that enables it to communicate wirelessly with the computing device 804 and the external controller 810. An example of one such supervisory control and data acquisition program is the Invensys Wonderware & Foxboro Evo™ Integration program by Schneider Electric. The wireless communication can be done, in an example, via photo-optical coupling of the programmable logic controller to a wireless transmitter operating on a spread spectrum of frequencies in order to encrypt the communications.

Still referring to FIG. 8, the external controller 810 of the computing device 804 comprises a master control program with signals that operate via a triple encryption spread over a spectrum in an upper radio bandwidth. In an example, the upper radio bandwidth comprises a bandwidth in the 30 or 300 mHz band. The spread spectrum denotes a change in frequency as data is being transmitted so that only a receiver 808 on the same frequency can receive the data. In an example, the external controller 810 can be a master control that can be used to command the computing device 804 to change operating parameters, as well as to report operating conditions on demand. In an example, the operating conditions reported on demand can be temperature, pressure, flow in different locations of the system, output voltage from each of the fuel cells, and input current into the super-heated steam generator 200, 300.

Still referring to FIG. 8, the computing device 804 and the internal controller 806 are encapsulated within the housing unit 802 in order to isolate the internal controller 806 and the computing device 804 from external interference. External interference can adversely affect the computing device's 804 ability to monitor, manage, and change the operating parameters. In an example, the housing unit 802 is comprised of stainless-steel.

Still referring to FIG. 8, the receiver 808 provides a communication mechanism for the external controller 810 to command the computing device 804. In an example, the receiver 808 is positioned on an exterior of the housing unit 802 and is optically coupled to the internal controller 806. That is, the receiver 808 is placed outside of the signal blocking enclosure, i.e. the housing unit 802, in order to avoid interference issues. The internal controller 806 can communicate with the receiver 808 since the receiver 808 is optically coupled with the computing device 804.

Still referring to FIG. 8, the computing device 804, internal controller 806, and external controller 810 may, in an example, include implementations via a computer readable storage medium (or media) having computer readable program instructions. Possible implementations of which are described subsequently.

The present subject matter may be a system, a method, and/or include an implementation by a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions, where applicable.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and/or computer program products according to various embodiments of the present subject matter. In this regard, each block in the flowchart or block diagrams may represent a module, segment, or portion of instructions, which comprises one or more executable instructions for implementing the present disclosure. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions, where applicable.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
forcing steam across a catalyst surface within a catalyst chamber comprising metal, the catalyst chamber being surrounded by magnets to create a magnetic field within the catalyst chamber; and
disassociating the steam into hydrogen and oxygen gas, wherein the steam has a temperature between about 350° C. and about 450° C.

2. The method of claim 1, wherein the catalyst surface comprises one of multi-walled carbon nanotubes, aluminum-gallium alloys, chromium and chromium-rare earth alloys, cobalt, cobalt samarium alloys, manganese, molybdenum, nickel, niobium, zirconium, palladium, and germanium.

3. The method of claim 1, wherein the catalyst surface has a configuration that comprises at least one of a sintered plug, a nanotube, a microtube, and a granular shape.

4. The method of claim 1, wherein applying steam comprises routing the steam through a stainless-steel tube to an end of a large aluminum tube of the catalyst chamber.

5. The method of claim 1, wherein the catalyst chamber has two opposing ends that each comprises a stainless-steel wire mesh for causing an even flow of the steam.

6. The method of claim 5, wherein the stainless-steel wire mesh comprises a fluidizing media.

7. The method of claim 1, further comprising:
arranging high energy anisotropic magnets around the catalyst chamber to achieve a predetermined density of magnetic flux within the catalyst chamber;
creating a magnetic field within the catalyst chamber;
passing the steam through the magnetic field; and
generating an electric current internally within the catalyst chamber resulting from the passage of the steam through the magnetic field.

8. The method of claim 7, wherein the high energy anisotropic magnets comprise N42SH Neodymium magnets having an energy density of at least 1.3 Tesla.

9. The method of claim 7, wherein arranging high energy anisotropic magnets comprises positioning the magnets in a configuration to cover at least 80% of a length of the catalyst chamber and such that the magnets are substantially, linearly centered within the catalyst chamber.

10. A system comprising:
a catalyst chamber that applies steam across a catalyst surface, surrounded by magnets to create a magnetic field within the chamber;
a cyclonic separator comprising an outer body and an inner body, wherein the cyclonic separator separates a hydrogen gas, an oxygen gas, and a water vapor derived from the steam;
at least one manifold that receives the separated hydrogen gas, oxygen gas, and water vapor; and
at least one fuel cell comprising an anode terminal and a cathode terminal, wherein the at least one fuel cell:
receives the oxygen gas and the hydrogen gas; and
generates a direct current electricity from the received oxygen gas and hydrogen gas.

11. The system of claim 10, wherein the catalyst surface comprises one of multi-walled carbon nanotubes, aluminum-gallium alloys, chromium and chromium-rare earth alloys, cobalt, cobalt samarium alloys, manganese, molybdenum, nickel, niobium, zirconium, palladium, and germanium.

12. The system of claim 10, wherein the outer body has a venturi configuration and the inner body has a configuration that comprises fins and egg-shaped projections.

13. The system of claim 10, wherein the cyclonic separator:
directly throughputs the hydrogen gas through the cyclonic separator;
spins the oxygen gas and the water vapor towards the outside of the cyclonic separator; and
exits the oxygen gas and the water vapor via an outlet positioned in a substantially perpendicular manner to the cyclonic separator.

14. The system of claim 10, wherein the at least one manifold comprises a hydrogen manifold and an oxygen manifold.

15. The system of claim 14, wherein the hydrogen manifold receives the hydrogen gas and the oxygen manifold receives the oxygen gas and the water vapor.

16. The system of claim 10, wherein the at least one fuel cell further comprises electrodes that serve as an output for the generated direct current electricity.

17. The system of claim 10, wherein the at least one fuel cell receives the hydrogen gas in the anode terminal.

18. The system of claim 10, wherein the at least one fuel cell receives the oxygen gas in the cathode terminal.

19. The system of claim 10, wherein the at least one fuel cell comprises a plurality of substrate loops that are attached to a central hydrogen fuel tube in a radial manner.

20. The system of claim 19, wherein the central hydrogen fuel tube comprises a cylindrical tube that extends the height of the fuel cell with perforations throughout the height to route gases to the plurality of substrate loops with the plurality of substrate loops comprising:
an interior that serves as an anode; and
an exterior that serves as a cathode.

21. The system of claim 20, wherein the central hydrogen fuel tube routes the hydrogen gas to the interior of the plurality of substrate loops and routes the oxygen gas to the exterior of the plurality of substrate loops.

22. The system of claim 20, wherein the anode comprises anode materials on one side of a semi-permeable substrate with a substrate thickness ranging from about 0.2 millimeters to about 0.5 millimeters, and wherein the cathode comprises cathode materials on an opposing side of the substrate.

23. The system of claim 20, wherein the central hydrogen fuel tube and the plurality of substrate loops are placed in a sealed cylindrical housing.

24. The system of claim 10, wherein the at least one fuel cell generates the direct current electricity comprises:

a reaction of the hydrogen gas with the oxygen gas within the at least one fuel cell to produce a water vapor, a heat, and the direct current electricity; and
a bottom side port of the at least one fuel cell to remove the water vapor and a condensed water.

25. The system of claim 10, wherein each of the at least one fuel cell generates at least 500 W of the direct current electricity at 12V.

26. The system of claim 10, further comprising:
an automated selector valve to enable a selection of at least one of:
a transmittal of the hydrogen gas and the oxygen gas to at least one of the fuel cell for production of direct current electricity; and
a transmittal of the hydrogen gas and the oxygen gas to a compressor to refuel a hydrogen vehicle.

27. A method comprising:
applying steam across a catalyst surface within a catalyst chamber;
applying a magnetic field within the catalyst chamber to achieve a predetermined density of magnetic flux within the catalyst chamber; and
passing the steam through the magnetic field;
wherein the interaction of the magnetic field and catalyst with the steam separates the hydrogen and oxygen molecules;
wherein the steam has a temperature between about 350° C. and about 450° C.

28. The method of claim 27, wherein the interaction of the magnetic field and electric current with the steam separates the hydrogen and oxygen molecules.

29. The method of claim 28, wherein the catalyst surface comprises one of multi-walled carbon nanotubes, aluminum-gallium alloys, chromium and chromium-rare earth alloys, cobalt, cobalt samarium alloys, manganese, molybdenum, nickel, niobium, zirconium, palladium, and germanium.

30. The method of claim 28, wherein the catalyst surface has a configuration that comprises at least one of a sintered plug, a nanotube, a microtube, and a granular shape.

31. The method of claim 28, wherein the catalyst chamber has two opposing ends that each comprises a stainless-steel wire mesh for causing an even flow of the steam.

32. The method of claim 31, wherein the stainless-steel wire mesh comprises a fluidizing media.

33. The method of claim 27, wherein the magnetic field is generated by high energy anisotropic magnets comprise N42SH Neodymium magnets having an energy density of at least 1.3 Tesla.

34. The method of claim 33, wherein arranging high energy anisotropic magnets comprises positioning the magnets in a configuration to cover at least 80% of a length of the catalyst chamber and such that the magnets are substantially, linearly centered within the catalyst chamber.

35. The method of claim 33, wherein generating an electric current occurs via creating an electromotive force.

36. A system comprising:
a cyclonic separator comprising an outer body and an inner body, wherein the cyclonic separator separates a hydrogen gas, an oxygen gas, and a water vapor derived from steam; and
at least one manifold that receives the separated hydrogen gas, oxygen gas, and water vapor,
wherein the outer body has a venturi configuration and the inner body has a configuration that comprises fins and egg-shaped projections, and
wherein the cyclonic separator: directly throughputs the hydrogen gas through the cyclonic separator; spins the oxygen gas and the water vapor towards the outside of the cyclonic separator; and exits the oxygen gas and the water vapor via an outlet positioned in a substantially perpendicular manner to the cyclonic separator.

37. A method comprising:
applying steam across a catalyst surface within a catalyst chamber comprising metal;
applying a magnetic field within the catalyst chamber to achieve a predetermined density of magnetic flux within the catalyst chamber;
passing the steam through the magnetic field; and
wherein the interaction of the magnetic field and catalyst with the steam separates the hydrogen and oxygen molecules;
wherein a cyclonic separator separates a hydrogen gas, an oxygen gas, and a water vapor derived from steam, and at least one manifold that receives the separated hydrogen gas, oxygen gas, and water vapor,
wherein an outer body of the cyclonic separator has a venturi configuration and an inner body has a configuration that comprises fins and egg-shaped projections,
wherein the cyclonic separator: directly throughputs the hydrogen gas through the cyclonic separator; spins the oxygen gas and the water vapor towards the outside of the cyclonic separator; and exits the oxygen gas and the water vapor via an outlet positioned in a substantially perpendicular manner to the cyclonic separator,
wherein the steam has a temperature between about 350° C. and about 450° C.

38. The method of claim 37, wherein the catalyst chamber has two opposing ends that each comprises a stainless-steel wire mesh for causing an even flow of the steam.

39. The method of claim 38, wherein the stainless-steel wire mesh comprises a fluidizing media.

40. The method of claim 37, wherein the magnetic field is generated by high energy anisotropic magnets comprise N42SH Neodymium magnets having an energy density of at least 1.3 Tesla.

41. The method of claim 37, wherein arranging high energy anisotropic magnets comprises positioning the magnets in a configuration to cover at least 80% of a length of the catalyst chamber and such that the magnets are substantially, linearly centered within the catalyst chamber.

42. The method of claim 41, wherein generating an electric current occurs via creating an electromotive force.

\* \* \* \* \*